Patented Oct. 20, 1942

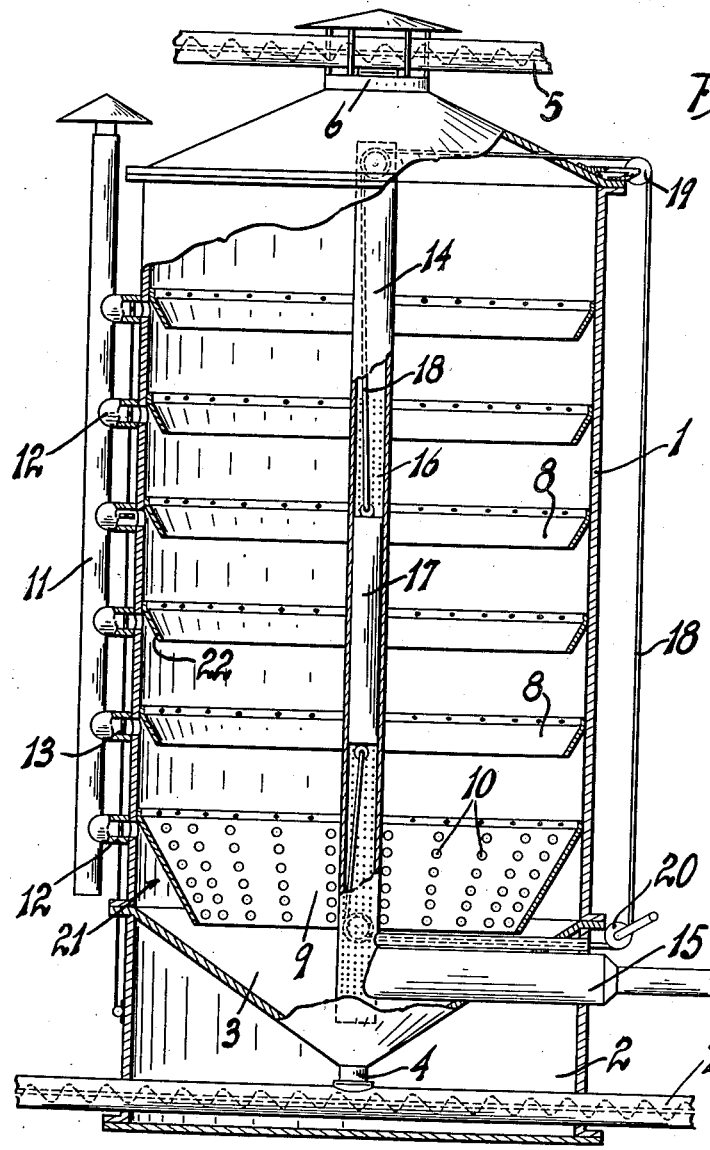
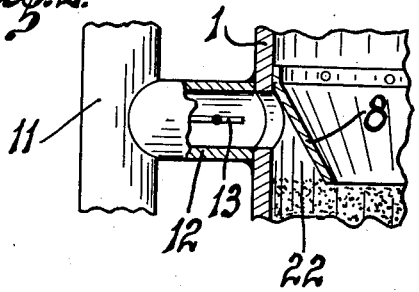
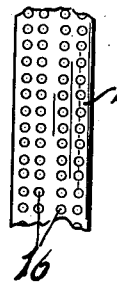

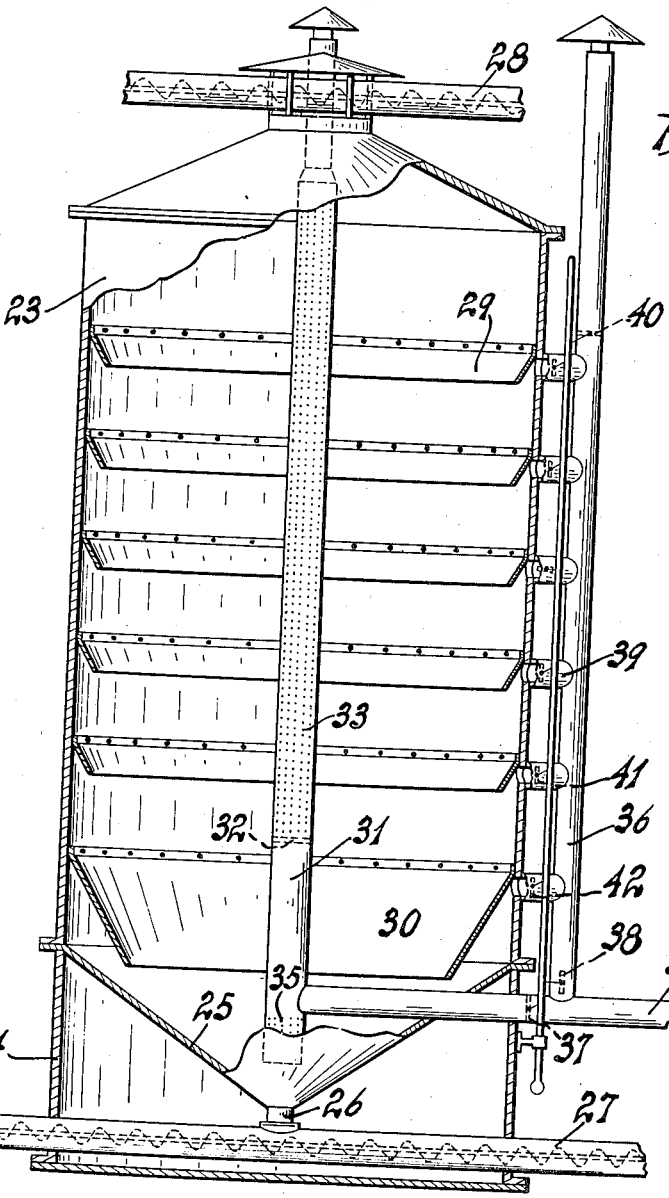
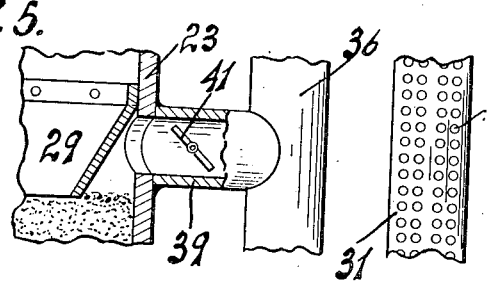

2,299,299

UNITED STATES PATENT OFFICE 2,299,299

GRAIN STORAGE AND TREATING TANK

Claud H. Bills, Los Angeles, Calif.

Application April 5, 1939, Serial No. 266,148

2 Claims. (Cl. 98—56)

This invention relates to a grain storage and treating tank, wherein grains of various types may be stored and simultaneously or subsequently treated for the purpose of removing excess moisture, and also in certain grains to kill injurious larvae or insects in the grain.

An object of my invention is to provide a novel grain storage and treating tank, in which the contained grain may be treated in batches, each treated batch being a part of the mass of grain within the storage tank, and each treated portion or batch of the grain being treated while a part of the entire mass of grain within the storage tank.

A further object of my invention is to provide a novel grain storage and treating tank, which will effectively protect the grain against rodents, and also enable the owner to withdraw portions or all of the grain for subsequent use with a minimum of effort and labor.

A feature of my invention relates in the novel arrangement of withdrawing grain from the bottom of the tank, and refilling into the top of the tank, thereby aerating the grain automatically.

Other features of my invention reside in the novel means to prevent molding of stored grain, the destruction of weevils, and their eggs or larvae, and the reduction of the breakage or cracking of the grain due to a minimum amount of required handling during the treating or ventilating of the grain.

Other objects, advantages and features of invention may appear from the accompanying drawings, the subjoined detailed description, and the appended claims.

In the drawings:

Figure 1 is a longitudinal, sectional view of my grain storage and treating tower, with parts broken away to show interior construction.

Figure 2 is a fragmentary side elevation, with parts broken away to show interior construction of one of the baffle rings and the air outlet pipe.

Figure 3 is a fragmentary side elevation of the perforated central air duct.

Figure 4 is a longitudinal, sectional view of a modified form of grain storage and treating tank.

Figure 5 is a fragmentary side elevation, with parts broken away of the tank and outlet pipe, showing one of the baffle rings.

Figure 6 is a fragmentary side elevation of the central air duct.

Referring more particularly to the drawings, the numeral 1 indicates a tank or tower, preferably formed of metal, and supported upon a suitable base or structure 2. A conical base 3 is provided on the tank 1, and the angle of this cone is such that the grain will not rest upon it, but will tend to move towards the central outlet pipe 4. Grain is conveyed into the top of the tank 1 through a conveyer pipe 5, which dumps the grain through the open top 6 of the tank. The grain is withdrawn from the bottom of the tank through the pipe 4, which extends into an outlet conveyer 7. The conveyers 5 and 7 are of any usual and well-known construction, the details thereof forming no part of this invention. I prefer, however, that these conveyers shall be of the spiral conveyer type. A plurality of baffle rings 8 are mounted on the inside of the tower 1, and are inclined inwardly, substantially as shown in Figure 1, for purpose to be further described.

A deflecting apron 9 is mounted on the inside of the tower 1 above the cone bottom 3. The apron 9 is preferably wider than the rings 8 and is provided with openings, slots, or louvers 10 therein, the purpose of which will be further described. This apron deflects the grain inwardly onto the cone bottom 3, thus enabling the grain to rest on an inclined surface, so that it may be readily withdrawn when desired through the conveyer 7.

An exhaust pipe 11 extends vertically and preferably on the outside of the tank 1. The exhaust pipe 11 is provided with a plurality of ducts 12, which extend into the tank 1 opposite each of the baffle rings 8, and also opposite the apron 9. A damper 13 is provided in each of the ducts, and these dampers are separately operable for the purpose of drying super-imposed batches of grain within the tower, as will be further described.

A vertical air duct 14 is positioned within the tank 1, and is preferably centrally located within the tank. An air intake pipe 15 extends into the duct 14, adjacent the lower end thereof. The duct 14 is provided with holes or openings 16 substantially throughout its entire length. When dehydrating or treating grain, hot air is normally forced through the pipe 15 and thence into the central intake duct 14. In order that the air flowing into the duct 14 may be controlled as to the area in which it exhausts, I provide an adjustable damper 17, preferably in the form of a piston. A cable 18 is attached to the top and bottom of the piston damper 17, and this cable extends outside of the tank 1, over a shive 19, thence over a manually operated drum 20, and thence back into the tank to the point of attachment on the piston damper 17.

The grain is treated in super-imposed layers or batches as follows:

The damper 17 is first moved downwardly in the intake duct 14 to a point adjacent its lower end. The air entering through the pipe 15 then passes out through the lower portion of the duct 14, thence through the grain, and finds an outlet through the lowermost exhaust duct 12, the damper 13 of which has been opened. Air will move in a path of least resistance and, therefore, when the lowermost damper 13 is opened, the air will pass obliquely from the central intake duct 14 to the outlet pipe 11. The apron 9 of the baffle rings 8 are inclined inwardly, and consequently an open space 21 will be provided between the wall of the tank 1 and the outer surface of the apron 9, and a similar space 22 will be provided between the rings 8 and the tank. Grain will not fill the spaces 21, 22, and consequently a passage or space is provided through which air can move to one or more of the outlet ducts 12. When the lowermost layer of grain has been treated, the damper 13 in the next duct immediately above is opened and the damper below is closed. The piston 17 is then raised a sufficient amount so that additional holes 16 are exposed, thereby permitting the next successive layer of grain to be treated in the same manner as previously described. This procedure is continued until the entire quantity of grain within the tank 1 has been treated.

The air, in passing through the grain to an outlet duct 12, will become saturated with moisture during the dehydration of grain, and the spaces 22 trap this moist air and direct it to the outlet duct, thus preventing the moist air from leaving its burden of moisture on the grain. The spaces 22 also provide a free conduit for the outgoing air, as previously stated. It is obvious that, if desired, a humidity indicator may be mounted on the top of the outlet pipe 11, which will indicate to the workman when it is necessary to change the dampers 13, so that the next successive layer or batch of grain may be treated.

I have discovered that temperatures of approximately one hundred forty (140) degrees Fahrenheit will effectively kill weevil eggs and larvae, and with my grain storage and treating tank, temperatures of this character can be obtained, thereby eliminating the weevil from certain grains, resulting in an additional marked saving to the owner. Under certain conditions, it is obvious that it may not be necessary to heat the incoming air, but this air may be simply dried and then circulated through the grain, as previously described, this dry air picking up the moisture in the grain and dehumidifying the same, as will be evident.

In the modification shown in Figures 4 to 6 inclusive, the construction is quite similar to the one previously described, with the exception that the air moves from the periphery of the tower to a substantially central and vertical exhaust pipe.

The tank or tower 23 is mounted on a suitable base 24. A conical bottom 25 is provided on the bottom of the tank 23, similar in arrangement and construction to the conical base 3. An outlet pipe 26 opens into the bottom conveyer 27, which is similar to the conveyer 7. The upper charging conveyer 28 is similar to the conveyer 5, previously described. The superposed baffle rings 29 within the tower 23 are similar in construction and arrangement to the rings 8. The bottom deflecting apron 30 is similar to the apron 9. In the modification, however, the apron 30 need not be perforated or slotted. The exhaust pipe 31 is arranged within the tower 23 and substantially central within the tower or tank.

A transverse wall 32 closes the exhaust pipe 31 adjacent the upper edge of the apron 30. Above the wall 32 the pipe is perforated, as shown at 33. An air intake pipe 34 extends through the wall of the tower 23 into the lower end of the pipe 31 and below this intake pipe, the pipe 31 is perforated as shown at 35. A combination intake and exhaust pipe 36 is preferably arranged outside of the tower 23, and extends upwardly from the intake pipe 34, as shown in Figure 4. A damper 37 is mounted in the pipe 34 for the purpose of controlling the flow of air to the pipe 31. A damper 38 controls the movement of air from the pipe 34 into the pipe 36. A plurality of horizontal ducts 39 extend from the pipe 36 into the side of the tower 23. These ducts enter the tower opposite the baffles 29 in the same manner as previously described for the ducts 12. An upper damper 40 in the pipe 36 is closed when the pipe 36 is used as an intake. A damper 41 is mounted in each of the ducts 39, and these dampers are each separately adjustable.

The operation of the modified form of tower is similar to that previously described insofar as the superimposed layers or strata of grain within the tower are concerned. The lowermost quantity of grain in the tower is first dried or treated by closing the damper 38 and opening the damper 37. The damper in the duct opposite the apron 39 is also opened. Hot or chemically treated air or gas forced through the pipe 34 passes out through the openings 35, thence through the grain, and this air escapes into the pipe 36 through the lowermost duct 39. The remaining layers or strata of grain are treated as follows:

The damper 37 is closed and the damper 38 is opened. The damper 40 at the upper end of the pipe 36 is closed. The air now passes into the pipe 36, thence through successive ducts 41 into the tower and the air exhausts through the openings 33 in the central pipe 31.

Having described my invention, I claim:

1. A grain treating and storage tower adapted to both treat and store grain comprising a vertical pipe within the tower and positioned centrally of the tower, said pipe having openings in the side thereof, an intake pipe extending into said vertical pipe, a second vertical pipe adjacent the wall of the tower and positioned outside of the tower, a plurality of ducts extending from the second vertical pipe into the side of the tower, a concial baffle ring on the inner surface of the tower opposite each of the ducts, said baffle ring being positioned above the ducts and extending around the inner surface of the tower concentrical therewith, and a damper in each of the ducts.

2. A grain treating and storage tower adapted to both treat and store grain comprising a vertical pipe within the tower and positioned centrally of the tower, said pipe having openings in the side thereof, an intake pipe extending into said vertical pipe, a second vertical pipe adjacent the wall of the tower and positioned outside of the tower, a plurality of ducts extending from the second vertical pipe into the side of the tower, a conical baffle ring on the inner surface of the tower opposite each of the ducts, said baffle ring being positioned above the ducts and extending around the inner surface of the tower concentrical therewith, and a damper in each of the ducts, and vertically adjustable plug in the first-named vertical pipe adapted to cover selected openings in the pipe.

CLAUD H. BILLS.